June 6, 1950  N. SIEVERDING  2,510,425
REMOTE CONTROL FOR HARVESTER REELS
Filed Feb. 8, 1949

Inventor
Norbert Sieverding
By Clarence A. O'Brien
and Harvey B. Jacobson
Attorneys Patented June 6, 1950

2,510,425

UNITED STATES PATENT OFFICE 2,510,425

REMOTE CONTROL FOR HARVESTER REELS

Norbert Sieverding, Fulda, Minn.

Application February 8, 1949, Serial No. 75,165

1 Claim. (Cl. 56—222)

This invention relates to a remote control for a harvester reel and has for its primary object to place within easy reach of the operator of a tractor to which the harvester is attached means by which the reel of the harvester may be raised or lowered during the advance of the harvester.

Another object is to adjust the position of the reel of the harvester and hold the adjustment until such time as a change in the position is desired.

The above and other objects may be attained by employing this invention which embodies among its features a rock shaft mounted on the harvester to rock about an axis which lies below and parallel with the common horizontal axis about which the harvester reel moves when being adjusted vertically, spaced lift arms carried by and extending radially from the rock shaft, links connected to the lift arms and to the reel supporting arms, a hand lever fixed to the rock shaft and movable in an arc above the drawbar of the harvester, the end of the hand lever remote from the rock shaft being within easy reach of the operator of a farm tractor to which the harvester is coupled, and releasable means carried by the hand lever and operable from the end thereof remote from the rock shaft for holding said hand lever in various positions in its arc of movement.

Other features include an arm fixed to the rock shaft intermediate its ends and extending radially therefrom in a direction opposite the lift arms and a counterbalance spring coupled at one end to the last-mentioned arm and at its opposite end to the harvester for assisting in elevating the reel.

Figure 1:
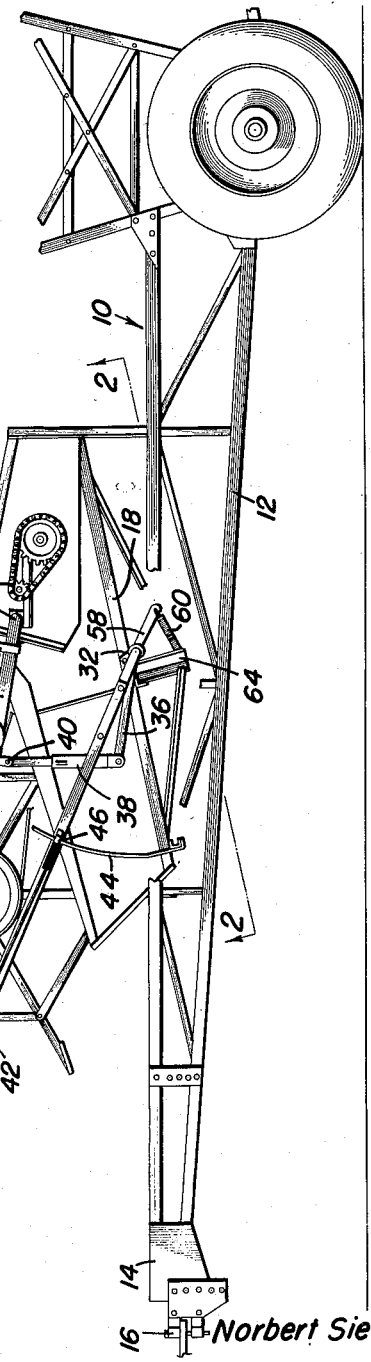
Figure 1 is a side view in elevation of a conventional combine harvester showing this improved remote control coupled thereto, certain portions of the harvester being broken away more clearly to illustrate certain details of the invention.
Figure 2:
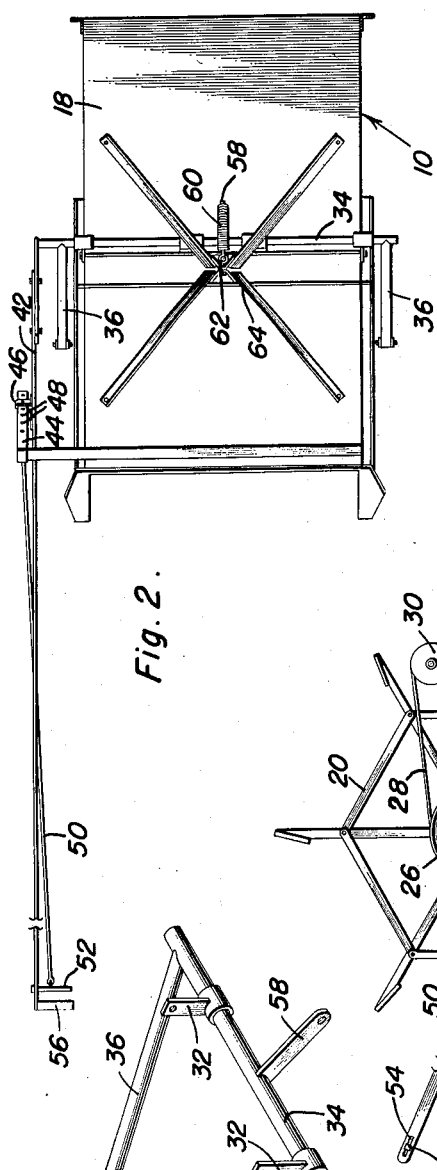
Figure 2 is a bottom plan view of the platform of a conventional combine harvester.
Figure 3:
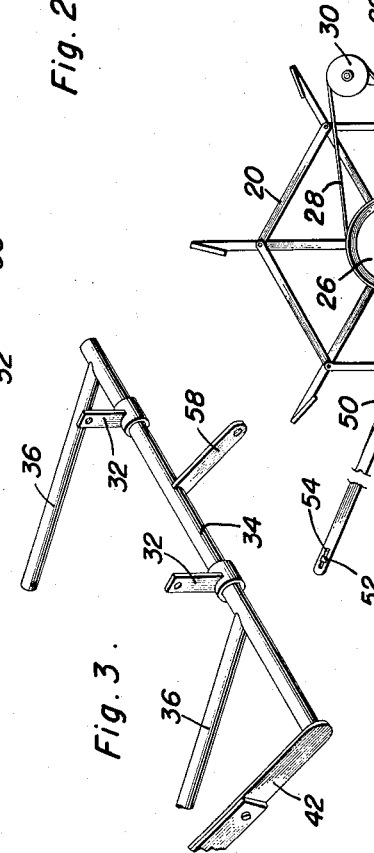
Figure 3 is a perspective view of the rock shaft and lift arms constituting a portion of my improved reel-control device.

Referring to the drawings in detail, a combine harvester designated generally 10 is supported on a wheeled carriage 12 having a forwardly extending drawbar 14 which is provided with a conventional clevis 16 for connection to the conventional drawbar of a farm tractor. Mounted on the frame 12 of the combine harvester 10 is a conventional platform 18, above which a conventional reel 20 is mounted to rotate about a horizontal axis which is movable through a vertical arc on reel-supporting arms 22 which are mounted on the harvester 10 above the platform 18, as at 24, to swing about a common horizontal axis which extends transversely of the harvester. The reel 20 is driven by a conventional drive pulley 26 over which a conventional drive belt 28 is trained, and this belt is carried about a conventional belt tightener 30 which is supported on one of the arms 22, so that irrespective of the position of the arms 22 and the reel 20, driving connection will be established between the drive pulley 26 and the operating mechanism of the combine harvester (not shown).

Fixed adjacent opposite sides of the platform 18 are supporting brackets 32 for a horizontally disposed rock shaft 34 which rocks about a transverse horizontal axis below the axis about which the arms 22 swing.

Fixed to and extending radially from the rock shaft 34 toward the forward end of the machine are lift arms 36 which move in vertical arcs below the reel supporting arms 22, and coupled to the ends of the lift arms 36 remote from the rock shaft 34 are the lower ends of adjustable links 38, the upper ends of which are pivotally coupled, as at 40, to the reel-supporting arms 22 intermediate their ends. It will thus be seen that as the rock shaft 34 is moved about its axis, the lift arms 36 will cause the arms 22 to swing about their common horizontal axis to raise or lower the reel 20. Fixed to one end of the rock shaft 34 is one end of an elongated hand lever 42 which rocks in a vertical arc above the drawbar 14 and extends forwardly toward the forward end of the combine to a point within easy reach of the operator of a tractor to which the combine is coupled. Carried by the frame 12 of the combine 10 in advance of the rock shaft 34 is an arcuate quadrant 44 which lies adjacent the arc through which the lever 42 swings, and mounted on the hand lever 42 adjacent the quadrant 44 is a conventional latch 46 which cooperates with spaced openings 48 in the quadrant in holding the hand lever 42 in various adjusted positions about the axis of the rock shaft 34. Coupled to the latch 46 and extending along the hand lever 42 is an operating bar 50 which terminates near the forward end of the hand lever 42 and has connected to its terminal remote from the latch 46 a hand grip 52 which is slidable in an elongated, longitudinal slot 54 formed in the hand lever. A stationary hand grip 56 is attached to the hand lever adjacent the hand grip 52 so that when the grips 52 and 56 are grasped, pull will be exerted on the control rod 50 to disengage the latch 46 from an opening 48 in the quadrant so that the hand lever may be swung about the axis of the rock shaft 34. It will thus be seen that the reel 20 may be moved to various positions about the common horizontal axis of the arms 22, and held in such position by the engagement of the latch 46 in one of the openings 48 of the quadrant 44.

In order to assist in the elevating of the reel 20, I provide the rock shaft 34 with a radial arm 58 which projects in a direction opposite the lift arms 36, and coupled at one end to the arm 58 is a retractile coil spring 60, the opposite end of which is anchored to an eye 62 carried by the bracing frame 64 of the platform 18. It will thus be seen that as the reel 20 is lowered by reason of the lowering of the lift arms 36, the spring 60 will be placed under tension and will serve as a counterbalance to assist in elevating the reel.

In use, it will be understood that the combine 10 is coupled to a conventional farm tractor by connecting the clevis 16 to the drawbar of the tractor, and with the reel elevating mechanism in place, it will be obvious that the end of the hand lever 42 remote from the rock shaft 34 will be positioned within easy reach of the operator of the tractor. When it is desired to elevate the reel, the grips 52 and 56 are grasped by the operator and pull is exerted on the control rod 50, thus releasing the latch 46 from one of the openings 48, and by moving the hand lever 42 upwardly or downwardly, it will be obvious that the rock shaft 34 will be moved about its axis to cause the lift arms 36 to move accordingly. When the desired position of the reel has been attained, the pressure is released on the hand grips 52 and 56, thus permitting the latch 46 to enter one of the openings 48 and support the reel 20 at the desired elevation. In this way, the operator of the tractor has at his command instant control of the position of the reel 20 so that the harvesting may progress without requiring that the operator stop the advance of the tractor and climb down from the seat thereof to adjust the position of the reel 20. As a consequence, much time and labor is saved, with the result that greater production can be attained.

While in the foregoing there has been shown and described the preferred embodiment of this invention, it is to be understood that minor changes in the details of construction, combination and arrangement of parts may be resorted to without departing from the spirit and scope of the invention as claimed.

Having described the invention, what is claimed as new is:

In a combine harvester of the type having a wheeled carriage, a drawbar carried by the carriage for coupling to a farm tractor, a pair of reel-supporting arms pivotally carried by the carriage for movement in spaced vertical arcs about a common horizontal axis which lies transversely of the carriage and a reel carried by the reel-supporting arms to rotate about an axis which lies parallel to the common horizontal axis, means for moving said reel-supporting arms in their respective vertical arcs and holding said reel in various adjusted positions relative to the carriage comprising a rock shaft to rock about an axis which lies below and parallel with the common horizontal axis, collars journaling said rock shaft, upstanding lugs carried by said collars for attachment to the carriage, spaced lift arms carried by and extending radially from the rock shaft, adjustable links connected to the lift arms and to the reel-supporting arms, a hand lever fixed to the rock shaft and movable in an arc above the drawbar, and releasable means carried by the hand lever and operable from the end thereof remote from the rock shaft for holding said hand lever in various positions in its arc of movement, an arm fixed to the rock shaft intermediate its ends and extending radially therefrom in a direction opposite the lift arms and a counterbalance spring coupled at one end to the last-mentioned arm and at its opposite end to the carriage for assisting in elevating the reel.

NORBERT SIEVERDING.

REFERENCES CITED

The following references are of record in the file of this patent:

UNITED STATES PATENTS

| Number | Name | Date |
|--------|------|------|
| 802,892 | Sharp | Oct. 24, 1905 |
| 1,452,282 | Pearson | Apr. 17, 1923 |